United States Patent
Klein

[11] Patent Number: 6,160,897
[45] Date of Patent: Dec. 12, 2000

[54] APPARATUS FOR OPERATION IN AN ON-EAR MODE AND AN OFF-EAR MODE

[75] Inventor: Erich Klein, Himberg, Austria

[73] Assignee: U.S. Philips Corporation, New York, N.Y.

[21] Appl. No.: 09/307,909

[22] Filed: May 11, 1999

[30] Foreign Application Priority Data

May 15, 1998 [EP] European Pat. Off. .............. 98890143

[51] Int. Cl.[7] .................................................. H04R 25/00
[52] U.S. Cl. ........................ 381/396; 381/322; 381/345; 381/386; 381/431; 181/148; 181/160; 181/184
[58] Field of Search .................................. 381/171, 347, 381/348, 396, 398, 423, 431, 322, 345, 386; 181/148, 160, 171, 184

[56] References Cited

U.S. PATENT DOCUMENTS

| | | | |
|---|---|---|---|
| 4,944,017 | 7/1990 | Cognasse et al. | 381/396 |
| 5,199,005 | 3/1993 | Forsberg | 381/396 |
| 5,303,209 | 4/1994 | Frasl | 181/160 |
| 5,524,151 | 6/1996 | Bleim | 381/396 |
| 5,903,076 | 5/1999 | Suyama | 381/396 |
| 5,953,436 | 9/1999 | Zimmermann | 381/396 |
| 6,075,866 | 6/2000 | Frasl et al. | 381/398 |

FOREIGN PATENT DOCUMENTS

| | | | |
|---|---|---|---|
| 0615398A1 | 2/1994 | European Pat. Off. . | |
| PCT/IB99/00814 | 6/1999 | Swaziland | H04M 1/03 |

*Primary Examiner*—Curtis A. Kuntz
*Assistant Examiner*—Suhan Ni
*Attorney, Agent, or Firm*—Steven R. Biren

[57] ABSTRACT

An apparatus (1) is constructed for operation in an on-ear mode and an off-ear mode and includes a housing wall (6) having passages (15) to allow useful sound waves to pass through, and additional passages (16) to allow the passage of sound waves which are in phase opposition to the useful sound waves and includes, behind the housing wall (6), an electroacoustic transducer (7) having a diaphragm (12), the transducer (7) being accommodated in an acoustically substantially impervious holder compartment (17). Sound-pressure frequency response influencing structures (18, 19) are arranged both in the sound path between the frontside (13) of the diaphragm (12) and the passages (15), and in the sound path between the rearside (14) of the diaphragm (12) and the additional passages (16).

5 Claims, 1 Drawing Sheet

APPARATUS FOR OPERATION IN AN ON-EAR MODE AND AN OFF-EAR MODE

BACKGROUND OF THE INVENTION

1. Field of the Invention

The invention relates to an apparatus, constructed for operation in an on-ear mode which apparatus comprises a housing having a housing wall to be applied to an auricle of an ear of a user of the apparatus and which accommodates inside the housing and adjacent the housing wall, an electroacoustic transducer having a diaphragm for producing with its frontside useful sound waves which propagate towards the housing wall and for producing with its rearside, sound waves which are in phase opposition to the useful sound waves, and the housing wall having at least one passage facing the frontside of the diaphragm and through which the useful sound waves can reach the auricle of an ear, and at least one additional passage, which is laterally offset with respect to the frontside of the diaphragm and through which the sound waves of opposite phase can reach the auricle of an ear.

2. Description of the Related Art

Such an apparatus of the type defined in the opening paragraph is commercially available as a portable telephone and includes an electroacoustic transducer manufactured by the Philips Electronics. In the known apparatus, the transducer housing of the transducer is directly secured to the housing wall which is to be applied to the auricle of an ear of a user of the known apparatus, the housing wall having several passages, in the form of holes of comparatively large diameter, and a chamber enclosing a given air volume connected to the transducer at its side which is remote from the housing wall, this chamber being small through-holes in a bounding wall which faces the housing wall of the housing of the known apparatus, these holes providing acoustic friction and via which acoustically damped sound waves of opposite phase are passed through a number of through-holes which each form an additional passage. In the known apparatus, a comparatively intricate construction is used and the known apparatus is constructed only for operation in an on-ear mode. Obviously, the known apparatus can also perform an acoustic reproduction while it is off a user's ear, but due to the specific construction, the reproducing conditions are acoustically unacceptable because in particular, the reproduction volume is inadequate and also because the sound pressure frequency response obtained while the apparatus is off the ear is not satisfactory.

SUMMARY OF THE INVENTION

It is an object of the invention to achieve, in a simple manner and using minimal means, that, in an apparatus of the type defined in the opening paragraph, not only operation with a satisfactory reproduction quality is possible in an off-ear mode, but a reproduction of satisfactory quality is also possible in an off-ear mode of the apparatus. According to the invention, in order to achieve this object with an apparatus of the type defined in the opening paragraph, the apparatus is, in addition, constructed for operation in an off-ear mode, and the apparatus comprises a holder compartment for accommodating the transducer, this holder compartment being substantially acoustically impervious in relation to the at least one passage and the at least one additional passage, and sound-pressure frequency response influencing means for influencing the sound-pressure frequency response of the useful sound waves are arranged in the sound path between the frontside of the diaphragm and the at least one passage and sound-pressure frequency response influencing means for influencing the sound-pressure frequency response of the sound waves of opposite phase are arranged in the sound path between the rearside of the diaphragm and the at least one additional passage. As a result of the measures in accordance with the invention it is achieved, in a simple manner and using minimal means that, with an apparatus in accordance with the invention, operation is possible both in an on-ear mode and in an off-ear mode and that a satisfactory reproduction quality is obtained in both modes of operation. This becomes possible because the provision of the substantially acoustically impervious holder compartment for holding the transducer precludes an undesired radiation of sound waves of opposite phase via undefined paths, so that there cannot be any unwanted attenuation of the useful sound waves by opposite-phase sound waves. The provision of the sound-pressure frequency response influencing means between the frontside of the diaphragm and the at least one passage in the housing wall to be applied to the auricle of an ear has a favorable influence on the useful sound waves in such a manner that the sound pressure frequency response is flattened, which is advantageous for a proper sound reproduction in both modes of operation. By the provision of the sound-pressure frequency response influencing means in the sound path between the rearside of the diaphragm and the at least one additional passage in the housing wall, a favorable situation is obtained for the sound-pressure frequency response in the range of comparatively low frequencies, which is also advantageous for a proper acoustic reproduction in both modes of operation.

In a transducer in accordance with the invention as described above it has proved to be very advantageous that a mounting ring is connected to the housing wall and surrounds a transitional zone which faces the at least one passage in the housing wall, that the transducer is attached to the mounting ring, the frontside of the diaphragm facing the transitional zone, that an additional ring is attached to the housing wall and surrounds an additional transitional zone which faces the at least one additional passage in the housing wall, that a fabric, which extends over the whole transitional zone, is attached to the mounting ring as the sound-pressure frequency response influencing means, and that a fabric, which extends over the whole additional transitional zone, is attached to the additional ring as the sound-pressure frequency response influencing means, because in this way, it is achieved that a mounting ring provided with a fabric is used both for holding the transducer and for influencing the sound-pressure frequency response which can be obtained by means of the transducer.

In a transducer as described above, having a mounting ring and having an additional ring it has proved to be particularly advantageous that the mounting ring and the additional ring together form a double ring to which a fabric, extending over the whole transitional zone and over the whole additional transitional zone, is attached, because this results in a particularly simple construction.

In a transducer in accordance with the invention, having a mounting ring and having an additional ring, a separate fabric may be provided in the area of each of the two rings, which fabrics may have different properties. However, it has proved to be particularly simple when the double ring comprises a first double-ring layer which faces the housing wall and a second double-ring layer which is remote from the housing wall, and the fabric is interposed between the two double-ring layers.

The measures in which the first double-ring layer is provided with a first adhesive layer for attaching the double ring to the housing wall, and the second double-ring layer is provided with a second adhesive layer for attaching the transducer to the double ring, have proved to be advantageous for securing a double ring to the housing wall and the transducer to the double ring in a particularly simple manner.

The afore-mentioned as well as further aspects of the invention will become apparent from the example of embodiment described hereinafter and will be elucidated with reference to this example.

BRIEF DESCRIPTION OF THE DRAWING

The invention will be described in more detail with reference to the drawing, which shows an embodiment given by way of example, to which the invention is not limited, in which.

DESCRIPTION OF THE PREFERRED EMBODIMENTS

Figure 1:
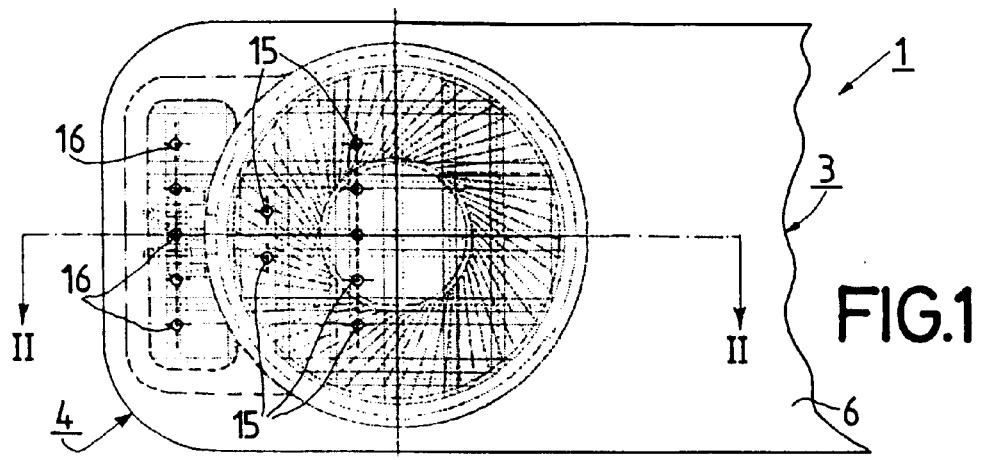
FIG. 1 is a plan view which shows a part of an apparatus in accordance with an embodiment of the invention, which takes the form of a portable telephone.
Figure 2:
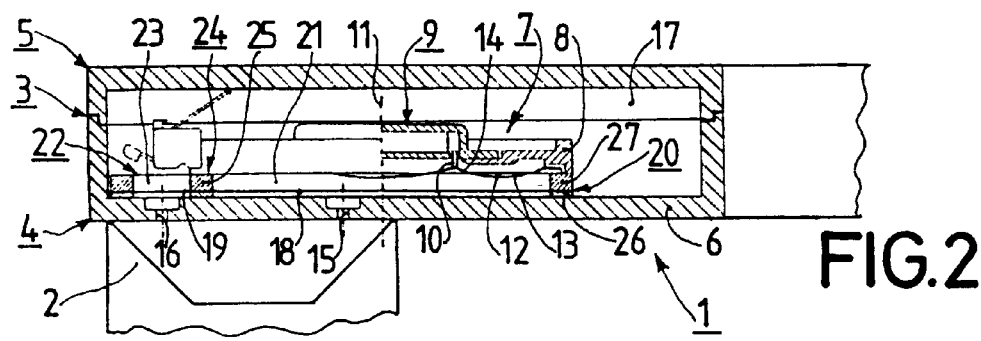
FIG. 2 shows the part of the apparatus shown in FIG. 1, largely in a cross-sectional view taken on the line II—II in FIG. 1, this part of the apparatus including an electroacoustic transducer secured to a housing wall of the apparatus by means of a double ring.

FIGS. 1 and 2 show an apparatus 1 which takes the form of a portable telephone. The apparatus 1 is adapted to operate in an on-ear mode, which means that in the on-ear mode, the apparatus 1 is applied to the auricle 2 of an ear of a user of the apparatus 1, as is shown diagrammatically in FIG. 2.

The apparatus 1 has a housing 3, which basically consists of a front housing section 4 and a rear housing section 5. The front housing section 4 has a front housing wall 6 which is adapted to be applied to the auricle 2 of an ear of a user of the apparatus 1, as can be seen in FIG. 2.

The housing 3 accommodates an electroacoustic transducer 7 adjacent the front housing wall 6. The electroacoustic transducer 7 can, for example, be of a construction identical or substantially identical to that of the transducer disclosed in the patent document EP 0 615 398 A1=corresponding to U.S. Pat. No. 5,524,151. The transducer 7 essentially comprises a transducer housing 8, a magnet system 9, a voice coil 10 arranged in an annular air gap of the magnet system 9, and a diaphragm 12 attached to the voice coil 10 and drillable by means of the voice coil 10 so as to be moved in the direction of a transducer axis 11. With its frontside 13, the diaphragm 12 produces useful sound waves which propagate towards the front housing wall 6, and with its rearside 14, the diaphragm produces sound waves which are in phase opposition to the useful sound waves and which initially propagate inside the housing 3.

In the apparatus 1, the front housing wall 6 has a total of seven passages 15 opposite the front side 13 of the diaphragm 12. The passages 15 are stepped in cross-section and each have a portion of larger diameter nearer the diaphragm 12 and a portion of smaller diameter farther away from the diaphragm 12, as can be seen in FIG. 2. The useful sound waves produced by the frontside 13 of the diaphragm 12 reach the auricle 2 of an ear of a user through the total of seven passages 15, when the user uses the apparatus 1 in the on-ear mode.

The apparatus 1 further has a total of five additional passages 16 which are laterally offset with respect to the frontside 13 of the diaphragm 12 and which have a shape similar to that of the passages 15. Through the additional passages 16, the opposite-phase sound waves produced by the rearside 14 of the diaphragm 12 also reach the auricle 2 of an ear in the on-ear mode, as can be seen in FIG. 2.

Advantageously, the apparatus 1 shown in FIGS. 1 and 2 is, in addition, constructed for operation in an off-ear mode. This means that also when the apparatus 1 is not applied to the auricle 2 of an ear, for example, when a user has placed the apparatus 1 onto a desk top, a correct reproduction of speech signal waves is guaranteed. Such an off-ear mode of operation is often referred to as hands-free operation.

In order to guarantee a correct reproduction in such an off-ear mode, the apparatus 1 has a holder compartment 17 for accommodating the transducer 7, this compartment being substantially acoustically impervious in relation to the passages 15 and the additional passages 16. It is to be noted that this holder compartment 17 need not be wholly acoustically impervious, but that the acoustic imperviousness of the holder compartment 17 should be distinctly higher than the acoustic imperviousness of the passages 15 and the additional 16. Practical tests have shown that the acoustic imperviousness of the holder compartment 17 should be at least a factor of ten (10) as high as the imperviousness of the passages 15 and the additional passages 16. By acoustically sealing the holder compartment 17, it is achieved that opposite-phase sound waves produced by the rearside 14 of the diaphragm 12 cannot reach the acoustic free space, i.e., the environment of the apparatus 1 in an uncontrolled manner and thus cannot cause an uncontrolled and undesired attenuation of the generated useful sound waves.

In order to achieve a trouble-free and satisfactory reproduction quality in the on-ear mode as well as in the off-ear mode, the apparatus 1 further comprises sound-pressure frequency response influencing means 18 for influencing the sound-pressure frequency response of the useful sound waves in the sound path between the frontside 13 of the diaphragm 12 and the passages 15, and sound-pressure frequency response influencing means 19 for influencing the sound-pressure frequency response of the opposite-phase sound waves in the sound path between the rearside 14 of the diaphragm 12 and the additional passages 16. With the aid of the sound-pressure frequency response influencing means 18, it is advantageously achieved that the sound-pressure frequency response is flattened in a very simple manner, as a result of which, undesired peaks in the sound-pressure frequency response are avoided. With the aid of the sound-pressure frequency response influencing means 19, it is also achieved advantageously that the amplitudes of the opposite-phase sound waves are reduced to desired values, which is important for a satisfactory reproduction quality.

Figure 3:
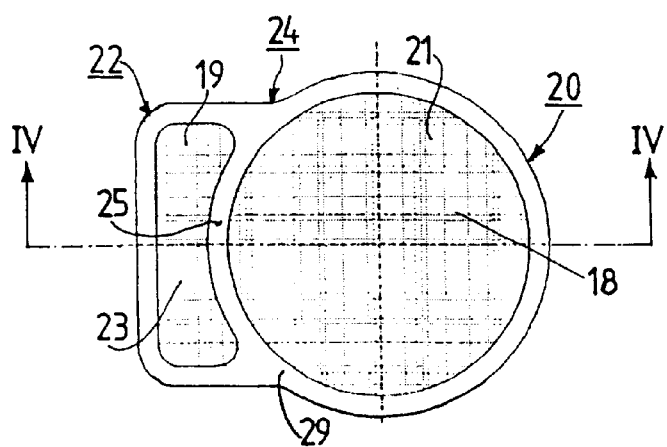
FIG. 3 is a plan view which shows the double ring for securing the electroacoustic transducer to a housing wall of the apparatus shown in FIGS. 1 and 2.
Figure 4:
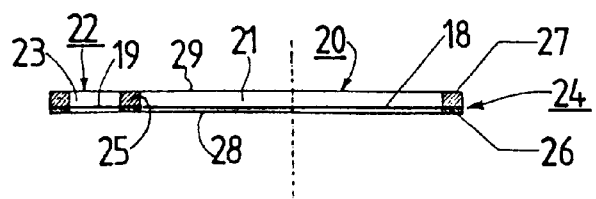
FIG. 4 is a cross-sectional view of the double ring of FIG. 3, taken on the line IV—IV in FIG. 3.

In the apparatus 1, a mounting ring 20, whose construction can be seen in FIGS. 3 and 4, is connected to the front housing wall 6. The mounting ring 20 surrounds a transitional zone 21 situated opposite the passages 15. The transducer 7 is connected to the mounting ring 20 in that the transducer housing 8 of the transducer 7 is attached to the mounting ring 20. The nature of the connection will be described in more detail hereinafter. As a result of this connection between the transducer 7 and the mounting ring 20, the frontside 13 of the diaphragm 12 faces the transitional zone 21 in the mounting ring 20.

Furthermore, an additional ring 22 is connected to the front housing wall 6 in the apparatus 1, this additional ring surrounding an additional transitional zone 23. The additional transitional zone 23 faces the additional passages 16 in the front housing wall 6.

A fabric, which extends over the whole transitional zone 21, is attached to the mounting ring 20 as the sound-pressure frequency response influencing means 18. A fabric, which extends over the whole additional transitional zone 23, is attached to the additional ring 22 as the sound-pressure frequency response influencing means 19.

As is apparent particularly from FIG. 3, the mounting ring 20 and the additional ring 22 form double ring 24, having a ring segment 25 which is common to the mounting ring 20 and to the additional ring 22. A fabric which extends over the whole transitional zone 21 and over the whole additional transitional zone 23 is attached to the double ring 24.

As is apparent from FIG. 2 and also from FIG. 4, the double ring 24 comprises a first double-ring layer 26 which faces the front housing wall 6 and a second double-ring layer 27 which is remote from the front housing wall 6. The fabric forming the two sound-pressure frequency response influencing means 18 and 19 is interposed between these two double-ring layers 26 and 27.

The double ring 24 consists of an acoustically impervious closed-pore foamed material, preferably polyurethane. The fabric is a close-meshed fabric of a synthetic material, preferably polypropylene. Such a fabric is advantageously water repellent and can even be watertight when the meshes are close enough.

Furthermore, the first double-ring layer 26 of the double ring 24 has been provided with a first adhesive layer 28 to attach the double ring 24 to the front housing wall 6 and the second double-ring layer 27 has been provided with a second adhesive layer 29 to attach the transducer 7, i.e., the transducer housing 8, to the double ring 24. It is to be noted that the two adhesive layers 28 and 29 are not shown separately in FIGS. 2 and 4 because this is deemed to be unnecessary.

The provision of the double ring 24 carrying the fabric results in a mechanically and constructionally simple design because the double ring 24 carrying the fabric serves both for securing the transducer 7 to the housing wall 6 of the apparatus 1 and for influencing the useful sound waves and the opposite-phase sound waves.

The invention is not limited to the embodiment described hereinbefore by way of example. In another variant, the transducer may also be mounted in an acoustically substantially impervious holder compartment by separate retaining means and sound-pressure frequency response influencing means which are separate from the retaining means may be provided in this holder compartment.

In an apparatus of a construction similar to the apparatus described hereinbefore, it is likewise possible that in the transitional zone, the double ring carries a first fabric, and in the additional transitional zone, carries a second fabric whose acoustic properties differ from those of the first fabric. Instead of a double ring, such an apparatus may comprise two separate rings, i.e., a separate mounting ring and a separate additional ring.

An apparatus in accordance with the invention need not be constructed as a telephone but may alternatively be constructed as a radio apparatus or as a so-called personal communicator.

What is claimed is:

1. An apparatus for operation in an on-ear mode, said apparatus comprising a housing having a housing wall for application to an auricle of an ear of a user of the apparatus, said apparatus including, inside the housing and adjacent the housing wall, an electroacoustic transducer having a diaphragm for producing, with a frontside, useful sound waves which propagate towards the housing wall, and for producing, with a rearside, sound waves which are in phase opposition to the useful sound waves, the housing wall having at least one passage facing the frontside of the diaphragm through which the useful sound waves pass for reaching the auricle (2) of an ear, and at least one additional passage laterally offset with respect to the frontside of the diaphragm and through which the sound waves of in phase opposition to the useful sound waves pass for reaching the auricle of an ear, characterized in that the apparatus is, in addition, constructed for operation in an off-ear mode, the apparatus further comprising:

a holder compartment for accommodating the transducer, said holder compartment being substantially acoustically impervious relative to the at least one passage and the at least one additional passage;

first sound-pressure frequency response influencing means, for influencing the sound-pressure frequency response of the useful sound waves, arranged in a sound path between the frontside of the diaphragm and the at least one passage; and second sound-pressure frequency response influencing means, for influencing the sound-pressure frequency response of the sound waves of opposite phase, arranged in a sound path between the rearside of the diaphragm and the at least one additional passage.

2. An apparatus as claimed in claim 1, characterized in that said apparatus further comprises:

a mounting ring connected to the housing wall and surrounding a transitional zone facing the at least one passage in the housing wall, the transducer being attached to the mounting ring and the frontside of the diaphragm facing the transitional zone; and an additional ring attached to the housing wall and surrounding an additional transitional zone facing the at least one additional passage in the housing wall, wherein said first sound-pressure frequency response influencing means comprises a fabric attached to the mounting ring and extending over the whole transitional zone, and wherein said second sound-pressure frequency response influencing means comprises a fabric attached to the additional ring and extending over the whole additional transitional zone.

3. An apparatus as claimed in claim 2, characterized in that the mounting ring and the additional ring together form a double ring, and the first and second sound-pressure frequency response influencing means comprise a fabric extending over the whole transitional zone and over the whole additional transitional zone.

4. An apparatus as claimed in claim 3, characterized in that the double ring comprises a first double-ring layer facing the housing wall, and a second double-ring layer remote from the housing wall, wherein the fabric is interposed between the first and second double-ring layers.

5. An apparatus as claimed in claim 4, characterized in that the first double-ring layer is provided with a first adhesive layer for attaching the double ring to the housing wall, and the second double-ring layer is provided with a second adhesive layer for attaching the transducer to the double ring.

* * * * *